United States Patent [19]

Makuuchi et al.

[11] 4,387,011

[45] Jun. 7, 1983

[54] RESIN COMPOSITION FOR AQUEOUS PAINT

[75] Inventors: Keizo Makuuchi, Shimotakeshi; Tohru Takagi, Takasaki; Hiroyuki Nakayama, Ninomiyamachi; Tsutomu Yamamoto, Kamakura, all of Japan

[73] Assignees: Japan Atomic Energy Research Institute, Tokyo; Kansai Paint Co., Ltd., Hyogo, both of Japan

[21] Appl. No.: 178,907

[22] Filed: Aug. 18, 1980

[30] Foreign Application Priority Data

Aug. 23, 1979 [JP] Japan .................. 54-107519

[51] Int. Cl.$^3$ .................. C08F 2/46; C08G 59/00
[52] U.S. Cl. .................. 204/159.15; 204/159.16; 204/159.22; 525/530; 525/531
[58] Field of Search .................. 204/159.15, 159.16, 204/159.22; 525/530, 531; 260/29.6 NR

[56] References Cited

U.S. PATENT DOCUMENTS

| | | | |
|---|---|---|---|
| 3,631,127 | 12/1971 | Nomura et al. | 525/531 |
| 3,882,187 | 5/1975 | Takiyama et al. | 204/159.15 |
| 3,963,798 | 6/1976 | Miller | 525/531 |
| 4,081,492 | 3/1978 | Traenckner et al. | 525/531 |
| 4,111,770 | 9/1978 | Najvar | 525/531 |
| 4,144,155 | 3/1979 | Araki et al. | 525/530 |
| 4,145,323 | 3/1979 | Sekmakas | 525/525 |

*Primary Examiner*—John C. Bleutge
*Assistant Examiner*—Herbert J. Lilling
*Attorney, Agent, or Firm*—Browdy & Neimark

[57] ABSTRACT

A resin composition for aqueous paint is produced by exposing to electron beams a mixture comprising 50 to 95 wt % of an epoxy resin, 1 to 23 wt % of an ethylenically unsaturated monomer having a carboxyl group and 4 to 44 wt % of a monomer having one ethylenically unsaturated bond in the molecule. The resin composition provides a coating having good coating surface, adhesion strength, solvent resistance, water resistance and processability.

5 Claims, No Drawings

RESIN COMPOSITION FOR AQUEOUS PAINT

This invention relates to a resin composition for aqueous paint. More particularly, the invention relates to an epoxy resin composition for aqueous paint that is produced by irradiating with electron beams a mixture of an epoxy resin, an ethylenically unsaturated monomer having a carboxyl group and a monomer having one ethylenically unsaturated bond in the molecule and which provides a coating having good coating surface, adhesion strength, solvent resistance, water resistance and processability.

An epoxy resin is a resin for paint that forms a coating having high corrosion resistance and good physical properties. An organic solvent has been conventionally used as a coating medium for the epoxy resin, but with the recent demand for stricter pollution control and conservation of resources, an epoxy resin paint that uses water as a coating medium has been developed. Two methods have been proposed to make an aqueous paint of the epoxy resin: (1) forced emulsification, and (2) grafting of a hydrophilic group to the resin. According to the first method, the epoxy resin is compelled to be emulsified with a surfactant in an aqueous medium heat consists mainly of water, but the aqueous dispersion of epoxy resin so formed has the following defects: (a) it is unstable and the epoxy resin easily separates from water; (b) the epoxy resin is not uniformly dispersed in water (i.e. epoxy particles of various sizes are present) and a coating having good physical properties is not obtained; and (c) the use of a large amount of surfactant produces a coating of low water resistance from which the surfactant oozes and which, therefore, is not suitable for application to the inner surface of food cans.

The second method involving grafting a hydrophilic group, was a fairly recent proposal (Japanese Patent Public Disclosure No. 1228/78), and according to the method (which is sometimes referred to as the thermal method in the following description) the epoxy resin is rendered self-emulsifiable by grafting the resin with a polymerisable water-soluble vinyl compound in an organic solvent using an organic peroxide initiator, and the resulting epoxy resin is dispersed in water. However, the method has the following defects: (a) since a large amount of organic solvent is necessary and the solvent works as a chain transfer agent, grafting efficiency is low and only a graft polymer of low molecular weight is formed; (b) due to low grafting efficiency, an ungrafted vinyl polymer and ungrafted epoxy resin easily separate from the grafted epoxy resin during application and a coating having poor appearance and physical properties is formed; (c) because of low grafting efficiency, a great amount of the organic peroxide initiator is necessary for producing an adequately emulsifiable product (i.e. at least several times the amount—less than 1 wt% of the polymerizable monomer—used in ordinary polymerization reaction and for providing an emulsion hvving good application properties); (d) the use of a large quantity of the organic peroxide provides an emulsion having improved stability but the molecular weight of the polymer produced is low. In consequence, the product has low curing efficiency, provides a baked coating of poor physical properties, and an appreciable amount of uncured components will dissolve into water or an organic solvent; and (e) since the thermal method requires a reaction temperature of 100° C. or more and a reaction time of one hour or longer, the oxirane ring in the epoxy resin reacts with an ethylenically unsaturated monomer having a carboxyl group or a polymer thereof and is consumed during resin manufacture. This can be only prevented by using an epoxy resin of low oxirane ring content, but then, the resulting emulsion contains only a small amount of oxirane ring, is low in reactivity and has poor curing efficiency.

One conventional technique similar to that of the present invention which irradiates with electron beams a mixture of an epoxy resin and a polymerizable vinyl compound is curing with electron beams. For example, Japanese Patent Publication No. 25990/71 entitled "Process for producing a cured product of epoxy resin" describes a method of applying a mixture of epoxy resin and styrene monomer and directly forming a coating by irradiation with electron beams. But as is well known, this method has the following defects and has not been put into practical use: (a) the coating has a low gel ratio and is low in chemical resistance and mechanical strength; (b) no grafting occurs in that part of the substrate which has not been exposed to electron beams, so the method cannot be applied to a substrate having an intricate configuration; (c) the mixture of epoxy resin and vinyl compound has high viscosity and is not easily applied in a thickness of 20 microns or less, which means a sizable portion of the mixture is not effectively used as a paint; and (d) since the thickness of coating which is to be irradiated with electron beams is about 100 microns at maximum, most of the electron beams applied are absorbed by the substrate, resulting in low efficiency of energy utilization.

Therefore, the coating industry has long desired a water-based resin composition that is entirely free from the defects of the conventional art and which provides a chemically stable coating having high water resistance, chemical resistance and physical properties and which undergoes only a small degree of dissolving-out of the coating components.

As a result of various studies to meet this desire, we have developed a new technique that eliminates all defects of the conventional art. According to this invention, by separating the step of irradiation with electron beams from the step of forming a coating, higher efficiency in utilizing the energy of electron beams is obtained, and by conversion to a water-dispersible paint, a coating having improved application properties and physical properties is provided. This invention provides an epoxy resin for aqueous paint, and it generally relates to a modified epoxy resin base having film-forming properties.

This invention relates to a substantially solvent-less method of modifying an epoxy resin to a water-dispersible epoxy resin by mixing a solid or liquid epoxy resin with a monomer mixture one component of which is a radical-polymerizable monomer having a carboxyl group and irradiating a sheet of the resulting mixture with electron beams. Upon irradiation with electron beams, the greater part of the polymer of the monomers is grafted onto the epoxy resin to produce a solid wherein fine particles of the grafted polymer, ungrafted polymer and ungrafted epoxy resin are uniformly dispersed.

The invention described in Japanese Patent Public Disclosure No. 1228/78 provides a solution that also contains a grafted polymer, ungrafted polymer and ungrafted epoxy resin, but the epoxy resin produced by irradiation with electron beams according to this invention has the following advantages: (a) since the reaction is performed in the substantial absence of solvent, a solid resin easy to store and transport is obtained, and there is a wide choice of additives and organic solvents necessary for preparing a paint formulation; (b) because of the absence of chain transfer to solvent, high grafting efficiency is obtained and there is no phase separation of ungrafted polymer and ungrafted epoxy resin during application, and so, a coating having good appearance is formed; (c) high grafting efficiency provides a stable emulsion having good application properties; (d) a polymer of high molecular weight, hence, high curing efficiency results, and it provides a baked coating having good physical properties from which only a very small amount of uncured components will dissolve into water or organic solvent; and (e) the reaction that occurs upon irradiation with electron beams does not require heating at elevated temperatures and finishes in a short period of time without consuming a great amount of the oxirane ring in the epoxy resin. Therefore, even an epoxy resin having high oxirane ring content will not gel. In addition, almost all oxirane rings in the epoxy resin remain intact in the solid obtained, thus providing a coating that is highly reactive and which has high curing efficiency. The advantages (a) through (e) described above are appendant to graft polymerization achieved only by irradiation with electron beams in the substantial absence of a solvent. A graft polymer obtained by irradiation with electron beams in the presence of a free-radical initiator typified by benzoyl peroxide contains an increased amount of impurities, produces an increased amount of ungrafted polymer without enhancing grafting efficiency, and the polymer obtained has low molecular weight. The results of comparison between the characteristics of a polymer synthesized by the thermal process and those of a polymer synthesized by the method of this invention will be described in a comparative example which is set forth hereunder.

The term "grafted polymer" as used herein means an epoxy resin onto which a polymer of a monomer having a carboxyl group has been grafted. The grafted polymer acts as an emulsifier in the presence of an alkali such as amine and it has the function of making a stable dispersion of ungrafted epoxy resin in an aqueous solvent. The term "ungrafted polymer" as used herein means an epoxy resin modified by addition-polymerization, rather than graft-polymerization, of a monomer having a carboxyl group. Because the polymer contains a carboxyl group, it is soluble or dispersible in water in the presence of an alkali. Therefore, the sheet of solid obtained by irradiation with electron beams in the manner described above can be dispersed in an aqueous alkali to form a stable aqueous dispersion of the epoxy resin.

The construction of this invention is described hereunder.

I. Components

A. Epoxy Resin (which is sometimes referred to as Component A hereunder)

The epoxy resin as one component of the composition of this invention is classified into the following five chemical structures:

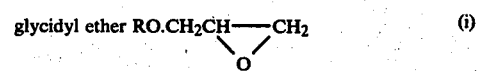

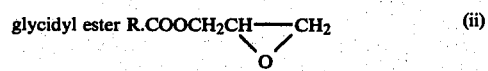

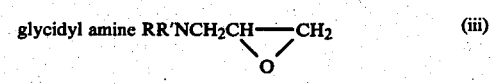

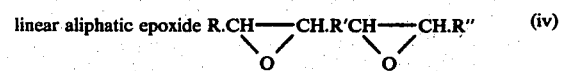

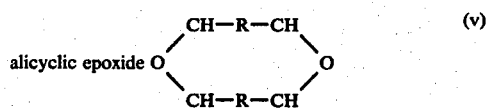

The glycidyl ether, glycidyl ester and glycidyl amine are produced by reacting the corresponding polyhydric alcohol, polybasic acid and polyamine with epichlorohydrin, followed by dehydrochlorination.

Typical epoxy resins and their structures are listed below.

Glycidyl ether type resins

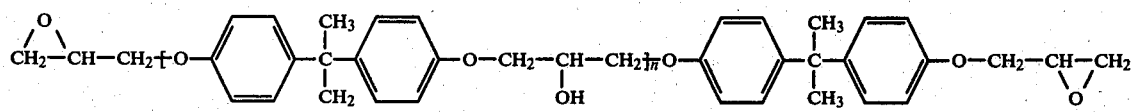

Bisphenol A diglycidyl ether (which accounts for 84 to 90% of the conventional epoxy resins)

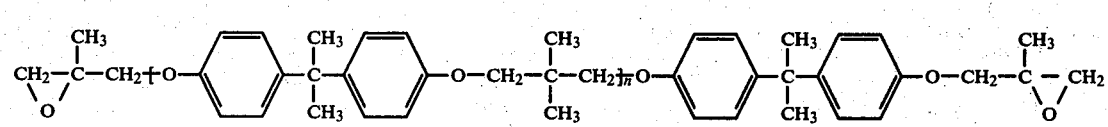

Bisphenol A di-β methylglycidyl ether

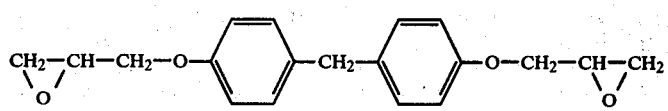

Bisphenol F diglycidyl ether

-continued
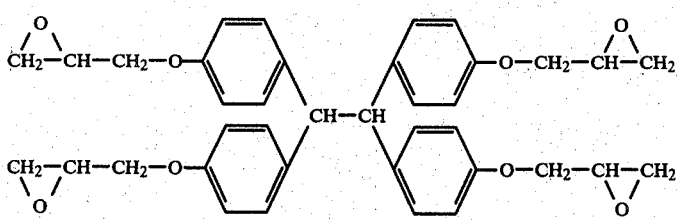
Tetrahydroxyphenylmethanetetraglycidyl ether
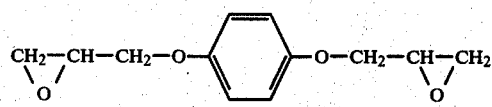
Resorcinol diglycidyl ether
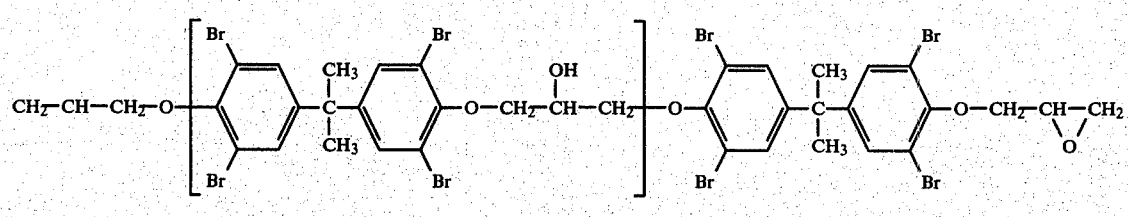
Bromated bisphenol A diglycidyl ether (bromine may be replaced by chlorine)
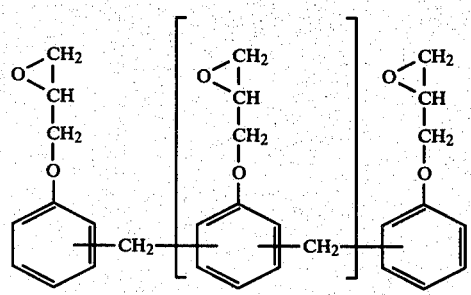
Nobdac diglycidyl ethyl
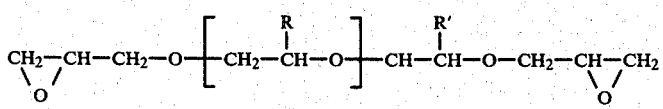
Polyalkylene glycol diglycidyl ether
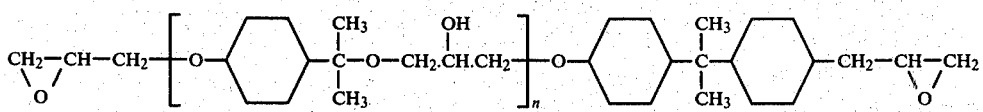
Hydrogenated bisphenol A glycidyl ether
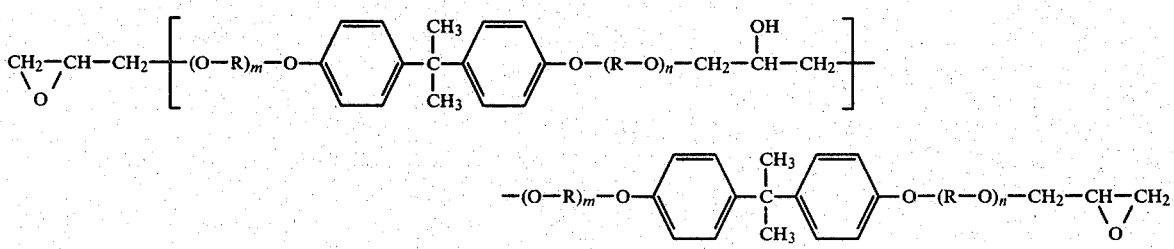
Diglycidyl ether of bisphenol A alkylene oxide adduct

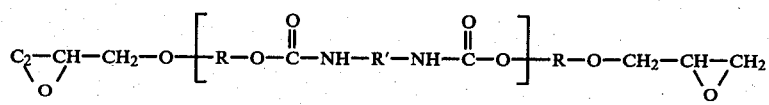

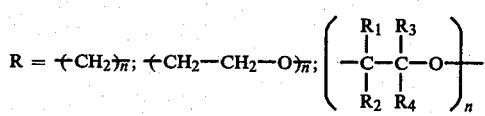

$R' = -\!\!+\!\!C_6H_4\!\!+\!\!;\ (CH_2)_{\overline{6}};\ -\!\!+\!\!C_6H_4-CH_2-C_6H_4\!\!+\!\!-$

*Epoxy urethane resin*

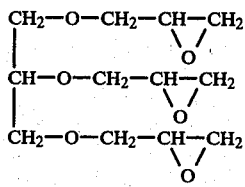 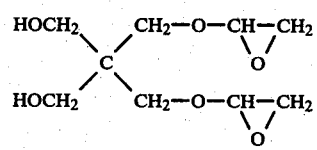

Glycerin triglycidyl ether     Pentaerythritol diglycidyl ether

*Glycidyl ether ester type resin*

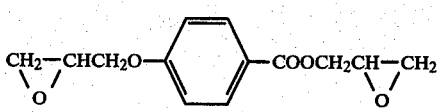

P—oxybenzoic acid glycidyl ether ester

*Glycidyl ester type resin*

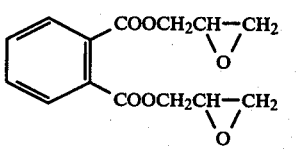 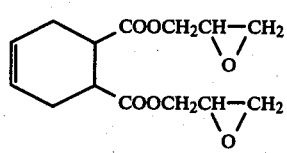

Phthalic acid diglycidyl ester     Tetrahydrophthalic acid diglycidyl ester

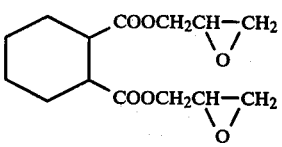 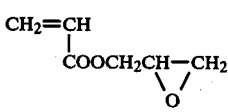

Hexahydrophthalic acid diglycidyl ester     Acrylic acid glycidyl ester

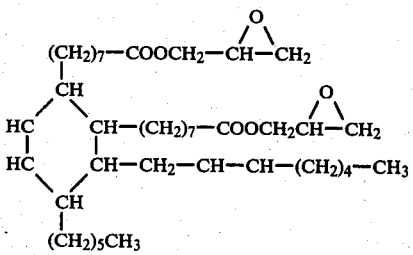

Dimer acid glycidyl ester

*Glycidyl amino type resins*

-continued
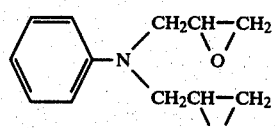
Glycidyl aniline
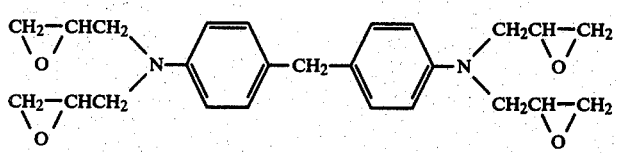
Tetraglycidyl diaminodiphenyl methane
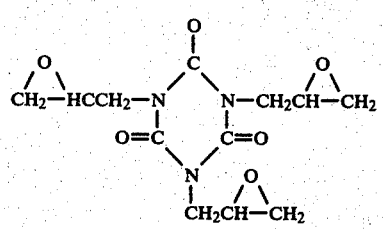
Triglycidyl isocyanurate
Linear aliphatic epoxy resins
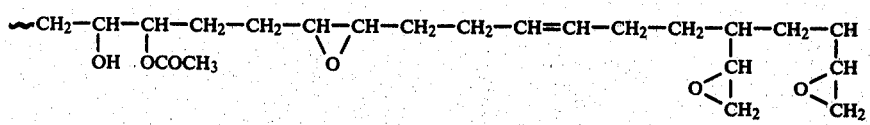
Epoxidized polybutadiene
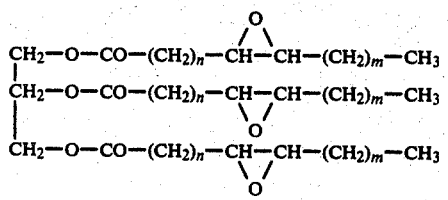
Epoxidized soybean oil
Alicyclic epoxy resins
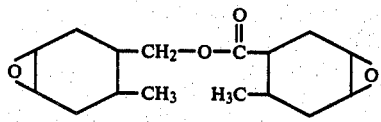
3,4-Epoxy-6-methylcyclohexylmethyl (3,4-epoxy-6-methylcyclohexane) carboxylate
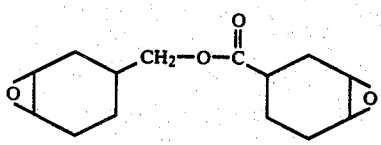
3,4-Epoxycyclohexylmethyl (3,4-epoxylcyclohexane) carboxylate

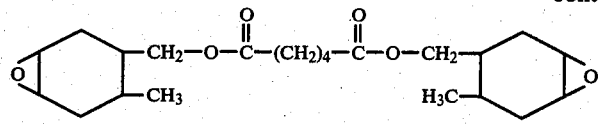

Bis(3,4-epoxy-6-methylcyclohexylmethyl) adipate

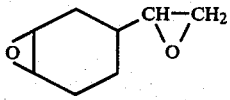

Vinyl cyclohexene diepoxide

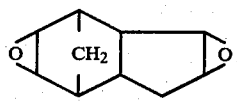

Dicyclopentadiene oxide

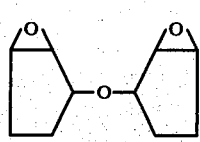

Bis(2,3-epoxycyclopentyl)ether

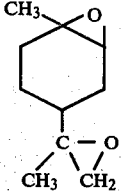

Limonene dioxide

Some commercial epoxy resins comprise the above listed resins having incorporated therein a reactive diluent such as n-butylglycidyl ether, a plasticizer such as dibutyl phthalate or a solvent such as toluene or methyl ethyl ketone. These epoxy resins are used in an amount of from 50 to 95 wt% preferably from 60 to 80 wt%, of the composition of this invention. If they are used in an amount less than 50 wt%, the monomer is polymerized slowly and a highly viscous emulsion results which cannot be easily applied in sprays unless the non-volatile content is reduced to less than 15% during application. In addition, the coating obtained by baking is low in water resistance. Using more than 95 wt% of the resins is not only uneconomical but also disadvantageous in application in sprays because the emulsion comprises coarse particles and hence is unstable.

B. Radical polymerizable ethylenically unsaturated monomer having a carboxyl group (which will sometimes be referred to as Component B hereunder)

The second component of this invention, or the radical polymerizable ethylenically unsaturated monomer having a carboxyl group is illustrated by acrylic acid, methacrylic acid, crotonic acid, itaconic acid, maleic acid and metal salts thereof. Component B is used in an amount of 1 to 25wt%, preferably from 10 to 23 wt%, of the composition of this invention. If the composition contains less than 1 wt% of Component B, it is not easily redispersed in water. Using more than 25 wt% of Component B provides a resin composition which forms a highly viscous emulsion that cannot be easily applied by spraying. In addition, the coating obtained by baking is low in water resistance.

C. Other polymerizable monomers (which is sometimes referred to as Component C hereunder)

Preferred monomers as Component C are miscible with the epoxy resin, and they are used to help Component B dissolve in the epoxy resin. Specific examples of Component B are styrene, p-methoxystyrene, α-methylstyrene, acrylic acid ester, methacrylic acid ester, acrylonitrile and methacrylonitrile. Component C is used in the composition of this invention in an amount of from 4 to 44 wt%. If the component is used in an amount less than 4 wt%, Component B is not thoroughly dissolved in the epoxy resin, and if the component is used in an amount greater than 44 wt%, the resulting composition cannot be dispersed in water.

II. Mixing the respective components

In the practice of this invention, a mixture of Components B and C is first prepared, and the mixture is then added to Component A. If Component A is an epoxy resin of low molecular weight, a conventional agitator may be used to form an intimate mixture of A, B and C. If Component A is an epoxy resin of high molecular weight, and hence, is highly viscous, a kneader or the like is necessary. The mixture may be heated to a suitable temperature below 100° C. A small amount of an organic solvent may be used to reduce the viscosity of Component A and facilitate mixing with the other components. To promote subsequent reaction that is caused by irradiation with electron beams, the mixture of Components B and C may be blended with Component A under purging with an inert gas.

III. Form of the mixture to be irradiated with electron beams

The mixture of Components A, B and C is: (a) extruded through an extruder into a sheet form; or (b) pressed between two plates; or if the mixture is highly fluid, (c) carried in a sheet form on a support. The thickness of the sheet is in the range of 0.1 to 50 mm and is determined by the range of electron beams emitted from the electron beam accelerator employed.

IV. Irradiation with electron beams

The following types of electron beams accelerator are used in this invention.

| Accelerator | Voltage (MW) | Current (mA) | Output (kW) |
|---|---|---|---|
| Van de Graaf generator | 1.0–3.0 | 0.2–1.0 | 0.2–3 |

-continued

| Accelerator | Voltage (MW) | Current (mA) | Output (kW) |
|---|---|---|---|
| Cockcroft-Walton machine | 0.5-3.0 | 1-10 | 1-15 |
| Resonant transformer | 1.0-2.0 | -66 | 6-12 |
| Dynamitron | 0.75-3.0 | 10-50 | 1-50 |
| Linear accelerator | 4-10 | 0.2-0.35 | 1-50 |
| Low-energy accelerator | 0.20 | | |
| Insulated core transformer | 0.20-0.75 | 20-200 | 20-100 |
| Oil-immersed transformer | 0.30-0.60 | 100-200 | 30-60 |

Electron beams are applied at a dose rate of $2 \times 10^{-2}$ to 30 MR/sec, preferably from 0.1 to 25 MR/sec to give a total dose of 0.1 to 30 MR, preferably 1 to 20 MR. The grafting of monomers to the epoxy resin depends upon the total dose and dose rate necessary for completing the graft polymerization, and the greater the total dose and the higher the dose rate, the higher the grafting efficiency and the greater the proportion of grafted epoxy resin produced. The lower the dose rate, the smaller the molecular weight of the resulting copolymer. If the monomer content is high a greater dose is required for completing the polymerization, so a grafted polymer is obtained in the amount necessary for emulsification even if the dose rate is low. However, if the dose rate is less than $2 \times 10^2$ MR/sec, the resulting polymer is low in dispersibility in water, has a large molecular weight, and forms a highly viscous emulsion that cannot be easily applied in sprays. If the monomer content is small, only a small dose is required, so a grafted polymer cannot be obtained in the amount necessary for emulsification unless high dose rate is employed. A dose rate higher than 30 MR/sec is impossible with the type of accelerators identified above. The mixture of Components A, B and C is irradiated with the dose necessary for completing polymerization, but at least 1 MR is necessary even if the monomer content is as small as 5%, and a dose greater than 30 MR is not necessary even if the monomer content is as high as 50%.

The epoxy resin (Epoxy), acrylic acid (AAC), styrene (St), methacrylic acid (MAc) and ethyl acrylate (EA) were compounded and irradiated with electron beams under the conditions both within and outside the range defined in this invention. The degree of neutralization, emulsifiability and application properties of the resulting resin compositions are set forth in the following Table.

vide an aqueous dispersion. Respective conditions for making such aqueous dispersion are described below.

I. Grinding the mixture of A, B and C after irradiation with electron beams

The solid obtained by irradiation with electron beams is ground to particles less than 1 mm in size at room temperature. There is no particular limitation on the method of grinding.

II. Type and amount of organic solvent

A mixture of known solvents, such as n-butanol, cyclohexanone, butyl cellosolve (ethylene glycol monobutyl ether) and tetrahydrofuran may be used. A solvent containing at least 40 wt% of n-butanol is preferred. The solvent is added in an amount of 10 to 200 parts by weight, preferably 30 to 120 parts by weight, per 100 parts by weight of the resin.

III. Type and amount of aqueous alkali

The base to make the aqueous alkali leaves the coating during curing, and preferred examples of the base are monoethanolamine, dimethylethanolamine, diethanolamine, triethylamine and ammonium hydroxide. The base is used in an amount of 5 to 100 equivalents, preferably 10 to 50 equivalents, per 100 equivalents of the monomer having a carboxyl group. The mixture of Components A, B and C cannot be dispersed in water if it contains less than 5 equivalents of the base. Using more than 100 equivalents of the base provides a dispersion that does not store well. The amount of water for dissolving the base is determined by the viscosity required, and it is generally from 100 to 500 parts by weight, preferably from 200 to 400 parts by weight, per 100 parts by weight of the ground mixture. If less than 100 parts by weight of water is used, the resulting dispersion is too high in viscosity to be applied smoothly. Using more than 500 parts by weight of water gives an uneconomical paint having low solid content. In summary, the dispersion usually contains 10 to 40 wt% of the epoxy resin, 5 to 30 wt% of the organic solvent, 0.1 to 3 wt% of the base and 30 to 80 wt% of water.

A particularly important fact about the procedure of making an aqueous dispersion of the mixture of A, B and C is that the epoxy resin modified by irradiation with electron beams is so highly emulsifiable that an epoxy resin yet to be treated with electron beams can also be dispersed in water. For this purpose, an intimate

| Sample No. | Epoxy* Mn | Components (wt %) | | | | | Irradiation conditions | | Degree of neutralization (%) | Emulsifiability | Application properties |
|---|---|---|---|---|---|---|---|---|---|---|---|
| | | Epoxy | MAc | AAc | St | EA | Mr/sec | MR | | | |
| 1 | 480 | 95 | | 1 | 1 | 3 | 10 | 0.1 | 100 | OK | OK |
| 2 | 9600 | 50 | 25 | | 25 | | 0.1 | 25 | 15 | OK | OK |
| 3 | 480 | 96 | | 0.5 | 1 | 2.5 | 10 | 0.1 | 100 | X | — |
| 4 | 9600 | 45 | | | 30 | | 0.1 | 30 | high residual monomer content | | |
| 5 | 9600 | 50 | 28 | | 22 | | 0.1 | 25 | 15 | OK | X |
| 6 | 9600 | 50 | | 6 | 24 | 20 | 0.1 | 30 | 100 | OK | OK |
| 7 | 9600 | 50 | | 4 | 26 | 20 | 0.1 | 30 | 100 | X | — |
| 8 | 9600 | 45 | | | | 15 | 0.1 | 30 | 15 | OK | X |

*Mn: The average molecular weight calculated by determination of oxirane group on the assumption that they are at both terminal ends.

The products produced by irradiating the mixtures of Components A, B and C with electron beams are ground into small particles which are dissolved or swollen in an organic solvent. An aqueous alkali is added to the solution and the mixture is stirred to provide an aqueous dispersion. mixture of the ground particles of epoxy resin treated with electron beams and an untreated epoxy resin is dissolved or swollen in an organic solvent, and the solution is stirred after addition of an aqueous alkali. The amount of dispersible untreated epoxy resin depends on the amount of carboxyl-containing monomer subjected to irradiation with electron beams, irradiation conditions, and the degree of neutralization, and it is generally in the range of 20 to 300 parts by weight per 100 parts by weight of the epoxy resin treated with electron beams.

Before making a paint formulation of the aqueous dispersion of epoxy resin thus prepared, a crosslinking agent for epoxy resin is added with advantage because a coating having good physical properties is formed. A common water-soluble amino resin is a suitable crosslinking agent. Illustrative water-soluble amino resins are di-, tri-, tetra-, penta- and hexa-methylolmelamine and methyl ether or butyl ether thereof, as well as a urea-formaldehyde condensate and urea-melamine condensate. The water-soluble amino resin is preferably used in an amount of 1 to 50 wt% based on the polymer component of the emulsion composition. With the water-soluble amino resin used in an amount within the above defined range, a coating having high water resistance, solvent resistant, chemical resistance, physical properties and weatherability is obtained.

An amine and acid may be used as a crosslinking agent in this invention. An applicable amine contains at least one primary amino group or at least two secondary amino groups in the molecule, for example, propylamine, monoethanolamine, ethylenediamine, hexamethylenediamine, diethylenetriamine, triethylenetetramine, tetraethylenepentamine, diethylaminopropylamine, N-aminoethylpiperazine, isophoronediamine, and methaphenylenediamine may be used. An applicable acid is a compound having at least two acidic —OH groups in the molecule, for example, a polyvalent carboxylic acid such as sebacic acid, succinic acid, adipic acid and phthalic acid as well as phosphoric acid, phosphoric acid ester, sulfuric acid and sulfuric acid ester may be used. The optimum amount of these amines or acids is from 0.2 to 2.0 equivalents per equivalent of the epoxy group. Before making a paint emulsion, a pigment for providing greater resistance to corrosion, a water-soluble resin for providing better application properties, an alkaline neutralizing agent and defoaming agent may be added. Such additives may be selected from among known compounds. There is also no particular limitation to the method of making a paint formulation, application and drying of a coating.

The construction and advantages of this invention are hereunder described in greater detail by reference to Comparative Example, Examples and Reference Example. The physical properties of the coating were evaluated by conducting test in the following manner.

Test Methods (1) Appearance of coating: by visual observation.

(2) Adhesion strength: Cuts were made in the coating with a knife, and a cellophane tape applied to it was peeled off rapidly. High adhesion strength was indicated by the number 10, and low adhesion strength by the number 1.

(3) Solvent resistance: The coating was rubbed vigorously with a gauze that absorbed methyl ethyl ketone, and the number of rubbings required to expose the substrate was counted.

(d) Water resistance: Half the length of the coated plate was immersed in boiling water for 30 minutes. The results are shown in Table 1 wherein W indicates the lower half of the plate immersed in water and WV the upper half exposed to water vapor. The sample that did not whiten was indicated by the number 10, and the sample that whitened throughout was indicated by the number 1. Adhesion strength was evaluated by the same method as in (b): high adhesion strength was indicated by the number 10, and low adhesion strength by the number 1.

(e) Bendability: The T-bend method was used wherein a substrate was folded, and impact-bent to right angle with a plate of the same thickness used as a spacer. The current flowing at a voltage of 7 volts across the bend line was measured.

(f) $KMnO_4$ consumption: The two-side coated plate 500 $cm^2$ wide was immersed in 500 ml of distilled water and left to stand at 100° C. for 30 minutes. The amount of $KMnO_4$ required to oxidize the organic matter in the coating was measured.

COMPARATIVE EXAMPLE

An experiment was conducted to compare the physical properties of polymers produced by the thermal process and the process of this invention. In the experiment, 140 g of an epoxy resin ($\overline{Mn}=5860$), and a mixture of 25 g of St, 25 g of MAc and 10 g of EA were used.

1. Solvent-less irradiation with electron beams

A mixture of the above identified epoxy resin and monomer mixture in a 500-cc flask was melted at 72° C. under agitation in a nitrogen gas atmosphere. The melt was pressed between Mylar sheets (50μ thick) into a sheet about 2 mm thick. The sheet on a conveyor (line speed: 3.3 m/sec) was solidified by passing it twice through an irradiation area (effective width in a line direction: 17 cm) at an accelerating voltage of 1.5 MeV and a current of 9 mA.

2. Thermal process

A solution of the epoxy resin in 56 g of butyl cellosolve was prepared in a flask, and after adding 84 g of n-butanol the mixture was stirred at 118° C. in a nitrogen gas atmosphere. A solution of the monomer mixture in 3.6 g of benzoyl peroxide prepared in another container was added dropwise to the solution of epoxy resin over two hours with the reaction temperature held at 118° C. Five minutes after the dropwise addition, the reaction temperature was reduced to 85° C., followed by a 30-minute heating to obtain the object resin composition.

| | Characteristics of the resins | |
|---|---|---|
| | Solvent-less irradiation with electron beams | Thermal process |
| Grafted copolymer (%) | 30 | 12 |
| Ungrafted copolymer (%) | 8 | 22 |
| Ungrafted epoxy resin (%) | 62 | 66 |
| Residual oxirane content (%) | 100 | 85 |
| Molecular weight distribution of the ungrafted copolymer | 3000–100000 | 500–15000 |

The solid resin composition obtained by the solvent-less irradiation with electron beams was ground to particles, and to 100 g of the particles, 28 g of butyl cellosolve and 42 g of n-butanol were added, and the mixture was melted at 72° C. under stirring. The melt was cooled to 50° C., and it was intimately mixed with 30 cc of 15% aqueous dimethylethanolamine. To the mixture, 300 cc of water was gradually added under stirring to make an aqueous dispersion.

To 172 g of the resin solution prepared by the thermal process, 30 cc of 15% aqueous dimethyl ethanolamine was added at a controlled temperature of 50° C. to make an intimate mixture. To the mixture, 300 cc of water was gradually added under stirring to make an aqueous dispersion. Two grams of an amino-plast resin (Cymel 370) was added to 200 g of each dispersion to obtain a modified emulsion. The four dispersions (two unmodified, and two modified) were mixed with dimethylethanolamine to provide a viscosity of 30 seconds (by Ford cup No. 4), and each mixture was sprayed onto an aluminum plate. The coating obtained was baked at 200° C. for 2 minutes. All dispersions were easy to apply in sprays.

| Characteristics of baked coating (thickness: $10 \pm 2\mu$) | | | | |
|---|---|---|---|---|
| | Solvent-less irradiation | | Thermal process | |
| | amino unmodified | amino modified | amino unmodified | amino modified |
| Coating appearance | A | A | B | B |
| Gel ratio (%) | 94 | 99 | 72 | 90 |
| Solvent resistance | 35 | >100 | 6 | 29 |
| Shapability | A | A | E | C |
| COD (ppm) | 0 | 2 | 25 | 6 |
| Water resistance (100° C., 30 min.) whitening | B | A | E | D |
| adhesion strength | B | B | E | C |

Note:
A, B, C, D, E represent the conditions of each factor tested of which A represents the best condition and E the worst.

Separation of grafted copolymer, ungrafted copolymer and ungrafted epoxy resin

The resin compositions prepared by the thermal process and solvent-less irradiation with electron beams (that of the thermal process was freed of n-butanol and butyl cellosolve at 50° C. by vacuum-drying) were dissolved in tetrahydrofuran in an amount of four times that of the resins, and then, ethanol eight times the amount of the resins was gradually added under stirring. When the mixture was centrifuged, the ungrafted epoxy resin of high molecular weight was separated. The supernatant was dried and mixed with 2-times tetrahydrofuran and 10-times chloroform. The mixture was stirred at 50° C. for one day. Upon centrifuging, the solution was separated into a thin upper layer and a lower layer. IR analysis of the upper layer showed that it was an ungrafted copolymer because it contained no epoxy resin. The lower layer was vacuum-dried, and the residue was mixed with five-times chloroform, and the mixture was centrifuged after 2-hour stirring. A thin upper layer comprising the ungrafted polymer resulted. The lower layer was vacuum-dried, and the resin component obtained was dissolved in 0.5% aqueous tetrahydrofuran to form the solution. The GPC (gel permeation chromatography) using UV detector and RI (refractive index) detector is used for isolation of polymer. In the GPC, UV detector and RI detector indicate molecular weight distributions of an epoxy resin and total resin component respectively. When the last-obtained solution was subjected to G.P.C., UV detector and RI detector indicate two peaks of low molecular weight and high molecular weight on their chart respectively. The peak area on the side of low molecular weight shown in UV chart was substantially the same as that shown in RI chart, and therefore, the epoxy resin of low molecular weight was confirmed. On the other hand, the peak area on the side of high molecular weight shown in RI chart was larger than that shown in UV chart, and therefore, the grafted copolymer of high molecular weight was confirmed.

EXAMPLE 1

A one-liter four-necked glass flask having a stirring rod, a pipe for introducing a nitrogen gas, a thermometer and a cooling pipe was charged with 350 g of an epoxy resin (Epikote 1007 of Shell Chemical), 60 g of methacrylic acid, 75 g of styrene and 15 g of ethyl acrylate, and by stirring the reaction mixture at 70° C. in a nitrogen gas atmosphere, a uniform blend of the epoxy resin and monomers was obtained. The blend was a highly viscous fluid having the viscosity of clay work. The blend (ca. 100 g) was placed between Mylar films (0.1 mm×30 cm×30 cm) and pressed into a circular sheet 2 mm thick and about 24 cm in diameter. The sheet sandwiched between the Mylar sheets was irradiated with a Cockcroft-Walton accelerator to give a total dose of 6 MR (accelerating voltage: 2 MeV, dose rate: 1MR/sec.). The irradiated sheet became hard and transparent and could be easily separated from the Mylar films. The sheet was ground with a coffee mill into particles less than 1 mm in size.

A hundred grams of the particles was placed in a 500-cc flask equipped a jacket through which 500 cc of water (50° C.) was passed. A mixture of 45 g of n-butanol and 45 g of butyl cellosolve was added to the solution, and stirred with a 4-bladed agitator. An aqueous alkali comprising 10 g of dimethylethanolamine in 285 g of distilled water was gradually added to the mixture which was vigorously agitated to form an aqueous dispersion. The dispersion contained 21.7% of non-volatile matter, had a pH of 8.4 and a viscosity of 44 cPs, and it was stable.

EXAMPLES 2 TO 12

The procedure of Example 1 was repeated except that the type of epoxy resin, composition of monomer mixture, the proportion of epoxy resin and monomer mixture, and irradiation conditions were varied. In Examples 2 and 3, the epoxy resin was mixed with the monomer mixture in a different proportion than in Example 1. In Examples 4 and 5, benzene and n-butanol were added as organic solvent to facilitate the mixing of the epoxy resin of high molecular weight (Epikote 1009, m.p. 152° C., product of Shell Chemical) and the monomer mixture. In Examples 6, 7 and 8, irradiation with electron beams was conducted at a dose rate different from that used in Example 1. In Example 9, a liquid epoxy resin was used. In Examples 10, 11 and 12, the composition of the monomer mixture was varied. The resin compositions thus irradiated with electron beams were converted into an aqueous dispersion in the same manner as in Example 1. The physical properties of the coatings prepared from those dispersions were satisfactory.

| Ex. No. | Epoxy resin Type | amount (g) | Composition of monomer mixture (g) | | | | | | Solvent | | Irradiation conditions | | |
|---|---|---|---|---|---|---|---|---|---|---|---|---|---|
| | | | sty-rene | meth-acrylic acid | acrylic acid | ethyl acry-late | methyl meth-acrylate | n-butyl meth-acrylate | benzene | n-butanol | accelerat-ing voltage (MeV) | dose rate (MR/sec) | total dose (MR) |
| 2 | Epikote 1007 | 50 | 2.1 | 1.9 | | 1.0 | | | | | 2 | 0.27 | 6 |
| 3 | Epikote 1007 | 95 | 2 1 | 1 9 | | 1 0 | | | | | 2 | 0.27 | 6 |
| 4 | Epikote 1009 | 70 | 2 1 | 1 9 | | 1 0 | | | | 28 | 2 | 0.27 | 6 |
| 5 | Epikote 1009 | 70 | 2 1 | 1 9 | | 1 0 | | | 28 | | 2 | 0.27 | 6 |
| 6 | Epikote 1007 | 117 | 2 1 | 1 9 | | 1 0 | | | | | 1 | 0.21 | 6 |
| 7 | Epikote 1007 | 117 | 2 1 | 1 9 | | 1 0 | | | | | 1.5 | 3.15 | 10.6 |
| 8 | Epikote 1007 | 117 | 2 1 | 1 9 | | 1 0 | | | | | 1.5 | 6.54 | 18.3 |
| 9 | Epikote 828 | 117 | 2 1 | 1 9 | | 10 | | | | | 1.5 | 6.54 | 18.3 |
| 10 | Epikote 1007 | 117 | 2 1 | | 14 | 1 5 | | | | | 2 | 0.27 | 6 |
| 11 | Epikote 1007 | 117 | 1 9 | | 14 | 1 3 | 4 | | | | 2 | 0.27 | 6 |
| 12 | Epikote 1007 | 117 | 1 9 | 1 0 | 9 | 1 3 | | 4 | | | 2 | 0.27 | 6 |

EXAMPLE 13

This example shows that the epoxy resin composition obtained by treatment with electron beams is not only water-dispersible but also makes untreated epoxy resin water-dispersible.

A mixture of 100 g of the resin particles prepared in Example 1 and 300 g of Epikote 828 of Shell Chemical was placed in a 3-liter flask equipped with a jacket through which water (50° C.) was passed, and the mixture was stirred with a 4-bladed agitator. To the mixture, 180 g of butanol and 160 g of butyl cellosolve were added, and the mixture was thoroughly stirred. Then, an aqueous alkali comprising 10 g of dimethylethanolamine in 370 g of dissolved water was gradually added, and the mixture was vigorously agitated. Following addition of 890 g of distilled water, the mixture was again agitated vigorously to give an aqueous dispersion. The dispersion contained 19.8% of non-volatile matter, had a pH of 8.2 and a viscosity of 31 cPs, and it was stable.

REFERENCE EXAMPLE

To 400 g of the aqueous dispersion of Example 1, 32 g of a 25% aqueous solution of a melamin resin (Cymel 350 of Americal Cyanamid Co.) was added, and the mixture was stirred to form a paint formulation. Throughout storage at room temperature for 30 days or at 50° C. for 10 days, no precipitate was formed and the viscosity was constant at 20 cPs.

The paint was sprayed onto a tinplate in a thickness of 50±10 mg/cm², and the coatings baked in a gas oven for 3 minutes at 170° C., 190° C. and 210° C. had good characteristics as shown in Table 1 below.

TABLE 1

| | Baking temperature | | | | | |
|---|---|---|---|---|---|---|
| | 170° C. | | 190° C. | | 210° C. | |
| Coating appearence | excellent | | excellent | | excellent | |
| Adhesion strength | 10 | | 10 | | 10 | |
| Solvent resistance | 36 | | 75 | | 100 | |
| Water resistance | W | | W | WW | W | WW |
| whitening | 9 | 10 | 10 | 10 | 10 | 10 |
| adhesion strength | 10 | 10 | 10 | 10 | 10 | 10 |
| Bendability (mA) | 19.5 | | 14.1 | | 14.5 | |

TABLE 1-continued

| | | | |
|---|---|---|---|
| KMnO₄ consumption | 5.27 | 2.71 | 0.48 |

What is claimed is:

1. An epoxy resin composition for aqueous paint wherein substantially all oxirane rings in the epoxy resin remain intact, comprising a composition produced by
   stirring at a temperature below 100° C. a mixture comprising 50 to 95 wt% of an epoxy resin, 1 to 23 wt% of an ethylenically unsaturated monomer having a carboxyl group, and 4 to 44 wt% of a monomer having one ethylenically unsaturated bond in the molecule and
   then exposing the mixture to electron beams at a dose rate of $2 \times 10^{-2}$ to 30 MR/sec to give a total dose of 0.1 to 30 MR.

2. A resin composition according to claim 1 wherein said total dose is 1 to 20 MR.

3. A composition according to claim 1 wherein the epoxy resin, ethylenically unsaturated monomer having a carboxyl group and the monomer having one ethylenically unsaturated bond in the molecule are mixed in the presence of an organic solvent.

4. A composition according to claim 1 wherein the epoxy resin, ethylenically unsaturated monomer having a carboxyl group and the monomer having one ethylenically unsaturated bond in the molecule are mixed in the presence of an inert gas.

5. A resin composition for aqueous paint comprising a composition produced by
   stirring a mixture comprising 50 to 95 wt% of an epoxy resin, 1 to 23 wt% of an ethylenically unsaturated monomer having a carboxyl group, and 4 to 44 wt% of a monomer having one ethylenically unsaturated bond in the molecule;
   forming said mixture into a sheet having a thickness of 0.1 to 50 mm;
   exposing said sheet to electron beams at a dose rate of $2 \times 10^{-2}$ to 30 MR/sec to give a total dose of 1 to 20 MR, said afore-mentioned steps being carried out at a temperature below 100° C. to thereby obtain a composition wherein the epoxy resin maintains substantially all of its oxirane ring content; and
   grinding the resultant irradiated sheet into particles.

* * * * *